(12) United States Patent  
Buck, Jr.

(10) Patent No.: US 12,469,141 B2
(45) Date of Patent: Nov. 11, 2025

(54) RECEIVER ENCODED ACTIVE OPTICAL COMPRESSIVE SENSING

(71) Applicant: LOCKHEED MARTIN CORPORATION, Bethesda, MD (US)

(72) Inventor: Joseph Robert Buck, Jr., Superior, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 664 days.

(21) Appl. No.: 17/868,631

(22) Filed: Jul. 19, 2022

(65) Prior Publication Data
US 2024/0029260 A1   Jan. 25, 2024

(51) Int. Cl.
*G06T 7/11* (2017.01)

(52) U.S. Cl.
CPC ...... *G06T 7/11* (2017.01); *G06T 2207/10036* (2013.01); *G06T 2207/20216* (2013.01)

(58) Field of Classification Search
CPC ............. G06T 7/11; G06T 2207/10036; G06T 2207/20216; G01S 17/26
See application file for complete search history.

(56) References Cited

U.S. PATENT DOCUMENTS

| 2015/0049210 A1* | 2/2015 | Rachlin .................. G02B 27/46 |
| | | 348/208.11 |
| 2022/0265231 A1* | 8/2022 | Shi ........................ G01N 23/041 |

* cited by examiner

*Primary Examiner* — Ayodeji O Ayotunde

(57) ABSTRACT

A system includes an optical source configured to generate an optical signal and illuminate a scene with the optical signal. A first spatial pattern generator comprising pixel elements is configured to form a mask, using the pixel elements, to mask a reflection of the optical signal received from the scene. A pattern controller is coupled to the first spatial pattern generator and configured to control the pixel elements individually to form the mask, and a detector is configured to measure an amplitude of the masked reflection of the optical signal. A digitizer is coupled to the detector and configured to digitize the measured amplitude into an amplitude value. A processor coupled to the pattern controller and the digitizer is configured to instruct the first pattern controller to form a first sequence of masks to sequentially mask reflections of the optical signal using the spatial pattern generator, store the amplitude value corresponding to the measured amplitude of the masked reflection of the optical signal for each mask in the first sequence of masks, and recover an array of signals from the scene based on the stored amplitude values and the first sequence of masks, wherein a number of the stored amplitude values and a number of masks in the first sequence of masks is less than a number of signals of the array of signals.

20 Claims, 12 Drawing Sheets

RECEIVER ENCODED ACTIVE OPTICAL COMPRESSIVE SENSING

STATEMENT REGARDING FEDERALLY SPONSORED RESEARCH OR DEVELOPMENT

Not applicable.

TECHNICAL FIELD

The present description relates in general to optical sensing and imaging, including, for example, active optical compressive sensing and imaging.

BACKGROUND

Active optical imaging involves an imaging system illuminating a scene with an optical signal and measuring reflections of the optical signal from the scene to generate an image of the scene. Imaging systems may be designed to achieve a certain signal-to-noise ratio, which is directly related to the amount of power needed to generate the optical signal used to illuminate the scene. The amount of power needed for a particular signal-to-noise ratio may scale linearly with the size of the scene being imaged. In addition, the amount of data collected measuring the reflections of the optical signal also may scale linearly with the size of the scene being imaged.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description. The detailed description includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

Many images and signals of interest are sparse having a relatively small number of non-zero data values. Sparse images and signals are very compressible after the signal data has been measured and collected. However, waiting until the signal data has been measured and collected before compressing the signal data is an inefficient use of power to generate the optical signals as well as of memory space to store the signal data before compression.

The subject technology proposes to measure and store signal data from reflections of an illuminated scene using a compressed form. The signal data in the compressed form may be processed to recover the image or signal of interest from the scene. Measuring the signal data in the compressed form requires fewer measurements which translates into lower power requirements for transmitter and receiver components of an imaging system. In addition, storing the signal data in the compressed form at the time of measurement reduces storage requirements for the system as well as bandwidth requirements if the signal data is transmitted to another system for processing.

According to aspects of the subject technology, an optical signal is generated and used to illuminate a scene. Reflections of the optical signal from the scene may be masked using a spatial pattern generator configured to form masks having pseudorandom patterns. An amplitude of the masked reflected optical signal may be measured for each mask in a sequence of masks formed by the spatial pattern generator. The number of measurements made may be significantly less than a number of pixels in the scene. Knowing the measured amplitude values and the respective patterns of the masks used when measuring the amplitude values allows an array of signals corresponding to an image or other signals of interest from a scene to be recovered using a convex optimization algorithm, for example. These and other features of the subject technology are described in further detail below.

Figure 1:
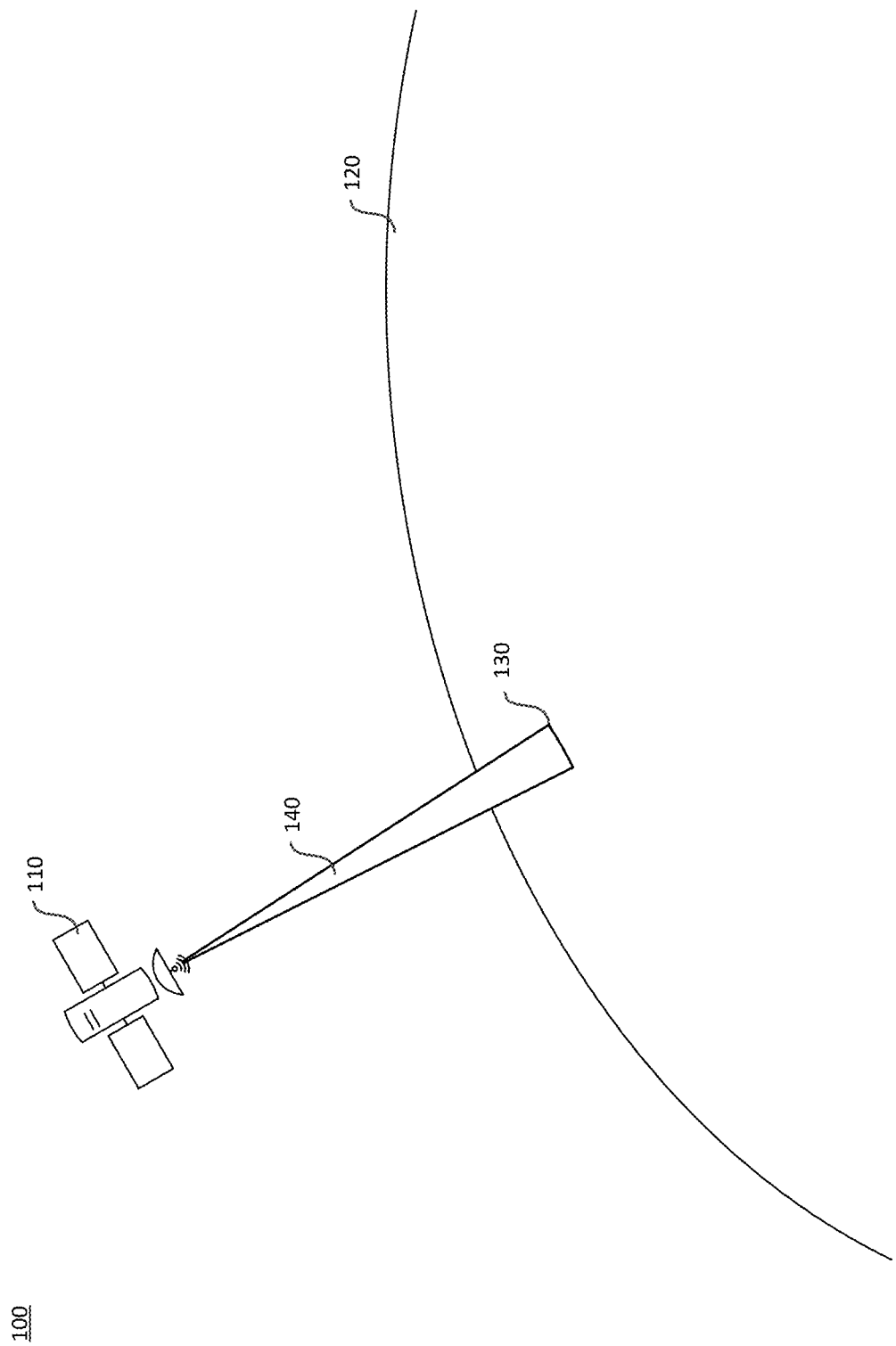
FIG. 1 is a diagram illustrating an environment in which aspects of the subject technology may be implemented.

FIG. 1 is a diagram illustrating an environment in which aspects of the subject technology may be implemented. Not all of the depicted components may be required, however, and one or more implementations may include additional components not shown in the figure. Variations in the arrangement and type of the components may be made without departing from the spirit or scope of the claims as set forth herein. Depicted or described connections between components are not limited to direct connections and may be implemented with one or more intervening components.

As depicted in FIG. 1, environment 100 includes satellite 110 orbiting planet 120 which may be Earth or another astronomical object. Satellite 110 may include an active imaging/sensing system configured to measure a signal of interest from scene 130 on planet 120 by illuminating scene 130 with optical signal 140 and measuring the reflections of the optical signal reflected back to satellite 110. As noted above, the reflections of the optical signal may be measured and stored in a compressed form which may be processed later to recover the image or signal of interest from the scene. Measuring and storing the reflections of the optical signal in the compressed form makes efficient use of power and data storage capacities that are typically limited on satellites.

FIG. 1 depicts an environment in which an active imaging/sensing system is incorporated into a satellite. The subject technology is not limited to this type of implementation. For example, the active imaging/sensing system may be incorporated into another flying vehicle such as an airplane or drone. Alternatively, the active imaging/sensing system may be incorporated into a mobile vehicle on the ground or an immobile structure on the ground.

Figure 2:
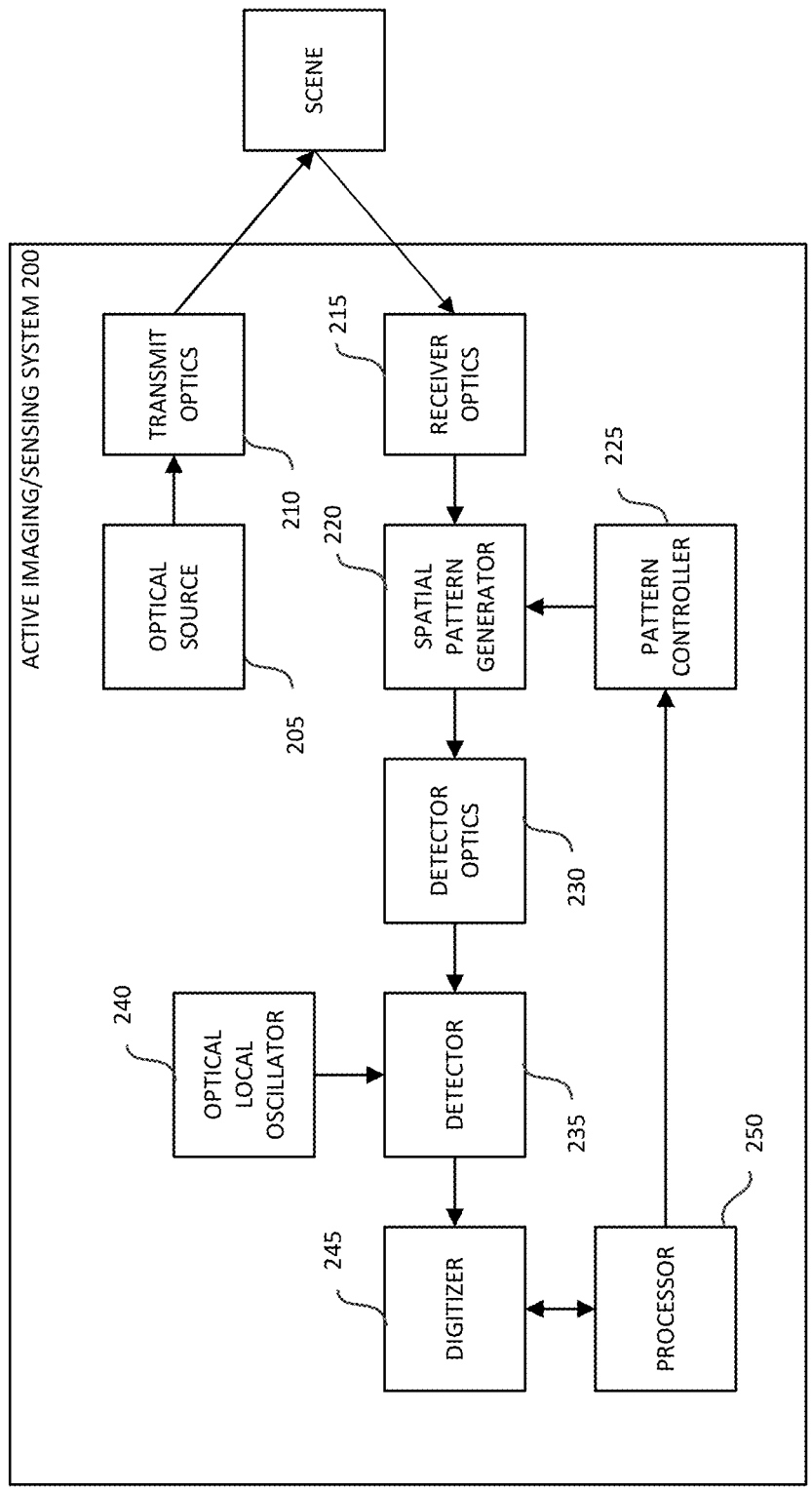
FIG. 2 is a block diagram illustrating components of an active imaging/sensing system according to aspects of the subject technology.

FIG. 2 is a block diagram illustrating components of an active imaging/sensing system according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections between components are not limited to direct connections and may be implemented with one or more intervening components.

As depicted in FIG. 2, active imaging/sensing system 200 includes optical source 205 which is configured to generate an optical signal and illuminate a scene via transmit optics 210. Optical source 205 may be a laser source configured to generate and emit a coherent light beam. Optical source 205 may modulate the coherent light beam according to a waveform. The waveform may be a pulse waveform, a chirped waveform, etc. Transmit optics 210 may include one or more lenses, mirrors, apertures, collimators, etc. arranged to transmit and focus the generated optical signal on the scene of interest. According to aspects of the subject technology, the scene is flood illuminated rather than being scanned pixel-by-pixel.

Active imaging/sensing system 200 further includes receiver optics 215 arranged to receive and focus reflections of the optical signal from the scene onto spatial pattern generator 220. Receiver optics 215 may include one or more lenses, mirrors, apertures, collimators, etc. According to aspects of the subject technology, spatial pattern generator 220 may be a device having an array of pixel elements that are individually controllable by pattern controller 225 to form a pattern used to mask the reflection of the optical signal received via receiver optics 215. For example, spatial pattern generator 220 may be a micro electromechanical system (MEMS) array of micromirror devices. The resolution of the array (e.g., 1,000×1,000) may correspond to the resolution of the image or signal of interest to be recovered from the scene. In this example, pattern controller 225 is configured to control the micromirror devices individually to redirect portions of the optical signal reflected by the scene according to a pattern. In this manner, the reflected optical signal is encoded with the pattern formed using spatial pattern generator 220.

According to aspects of the subject technology, pattern controller 225 may include suitable logic, circuitry, and/or code that enable receiving instructions containing or identifying a pattern and controlling the individual pixel elements of spatial pattern generator 220 to form the pattern. Pattern controller 225 or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or in a combination of both.

Active imaging/sensing system 200 further includes detector optics 230 arranged to receive the masked reflection of the optical signal from spatial pattern generator 220 and focus the masked reflection on detector 235. Detector optics 230 may include one or more lenses, mirrors, apertures, collimators, etc. arranged to receive and focus the masked reflection on detector 235. Detector 235 may be configured to measure an amplitude of the masked reflection of the optical signal. According to aspects of the subject technology, detector 235 is configured to measure a single amplitude for the entire masked reflection focused on detector 235 for each mask formed by spatial pattern generator 220.

Detector 235 may be implemented using a photodiode, or some other type of photodetector, configured to measure the amplitude of the masked reflection by converting photons received in the masked reflection into an electrical signal. Digitizer 245 is coupled to detector 235 and is configured to digitize the electrical signal of the measured amplitude into an amplitude value that is read out and stored by processor 250 for later processing. Digitizer 245 may include suitable logic, circuitry, and/or code that enable the digitizing of the electrical signal into an amplitude value.

Processor 250 may include suitable logic, circuitry, and/or code that enable processing data and/or controlling operations of active imaging/sensing system 200. In this regard, processor 250 may be configured to provide instructions to pattern controller 225 that include a pattern or identify a pattern accessible to pattern controller 225 to form a mask using spatial pattern generator 220. Mask patterns may be stored in memory incorporated into processor 250 and/or memory external to processor 250 (not shown). Processor 250 may be configured further to read out or receive amplitude values digitized by digitizer 245 and store the amplitude values in association with the pattern of the mask used to mask the reflection of the optical signal represented by the amplitude value. Similar to the mask patterns, the amplitude values may be stored in memory incorporated into processor 250 and/or in memory external to processor 250 (not shown). Processor 250 also may be configured to recover an array of signals representing an image of the scene or another signal of interest from the scene using a set of amplitude values and corresponding mask patterns. These and other operations are described in further detail below.

Processor 250 or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

According to aspects of the subject technology, detector 235 and digitizer 245 may be configured to operate in a direct, linear mode where the reflected optical signal is digitized as an amplitude over time. Detector 235 and digitizer 245 also may be configured to operate in a Geiger mode where digitizer 245 captures a timing of pulses of the optical signal generated by optical source 205 and digitizes the measured amplitudes based on the timing of optical source 205 transmitting the optical signal. Detector 235 and digitizer 245 also may be configured to operate in a coherent detection mode, where the masked reflected optical signal is mixed with a local oscillator signal generated by optical local oscillator 240 and measurement or detection of the amplitude of the masked reflected signal is based on the mixed optical signal. In the coherent detection mode, both and amplitude and phase, or quadrature signals, of the reflected optical signal may be measured and digitized.

Figure 3:
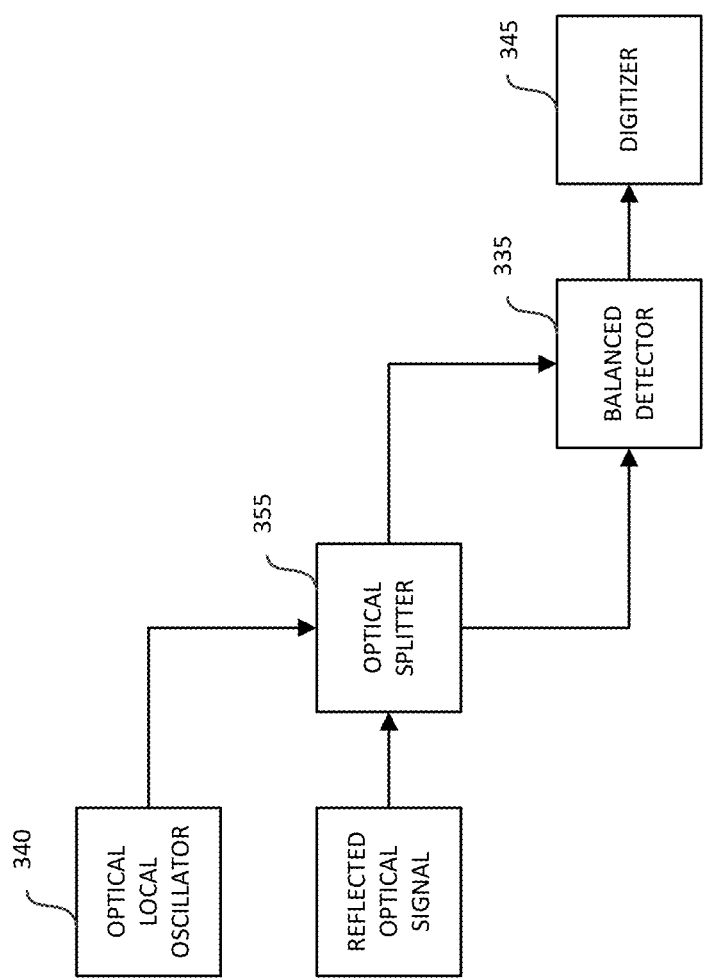
FIG. 3 is a block diagram illustrating an arrangement of components from an active imaging/sensing system according to aspects of the subject technology.

FIG. 3 is a block diagram illustrating an arrangement of components from an active imaging/sensing system according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections between components are not limited to direct connections and may be implemented with one or more intervening components.

The arrangement depicted in FIG. 3 includes balanced detector 335, optical local oscillator 340, digitizer 345, and optical splitter 355. Balanced detector 335, optical local oscillator 240, and digitizer 345, generally correspond with detector 235, optical local oscillator 240, and digitizer 245 depicted in FIG. 2. As represented in FIG. 3, a local oscillator signal generated by optical local oscillator 340 may be mixed and split together with the masked reflected optical signal using optical splitter 355. The split mixed signals may then be used to perform a balanced detection of the amplitude of the reflected optical signal using balanced detector 335. Similar to the operations described with respect to FIG. 2, digitizer 345 may be configured to digitize the measured amplitude of the reflected optical signal.

According to aspects of the subject technology, an array of signals corresponding to an image or a different signal of interest from a scene may be recovered from reflections of an optical signal from the scene without having to perform a measurement for each signal in the array of signals (e.g., 1,000,000 measurements for an array of 1,000×1,000 signals). For example, the number of measurements needed to recover the array of signals may be reduced by 90% or more (e.g., reduced to 100,000 or less) by using a sequence of masks having unique patterns to mask the reflected optical signal and measuring an amplitude of the reflected optical signal for each mask in the sequence. The unique patterns used to form the masks may be pseudorandom patterns with approximately half of the pixel elements used to form the masks turned on to allow portions of the reflected optical signal to pass to the detector and approximately half of the pixel elements turned off to prevent portions of the reflected optical signal from reaching the detector. The sequence of masks may be formed using unique pseudorandom patterns that are generated with minimal overlap between the patterns.

For a set of measured amplitude values and corresponding mask patterns, there exists an array of signal values (e.g., an image) that would produce the set of measured amplitude values when the reflected optical signal is masked using the respective mask patterns. A dimensionality change may be performed based on the set of measured amplitude values with the corresponding mask patterns to produce the array of signal values. Coefficients for the dimensionality change may be determined by doing a gradient analysis using a metric for the scene (e.g., entropy, sharpness, etc.). Increasing or decreasing the coefficient values in the wrong direction will add pattern or structure to the scene increasing the entropy of the scene, for example. Convex optimization algorithms may be used to determine the optimal set of coefficients that result in a minimum amount of entropy for the scene.

Figure 4:
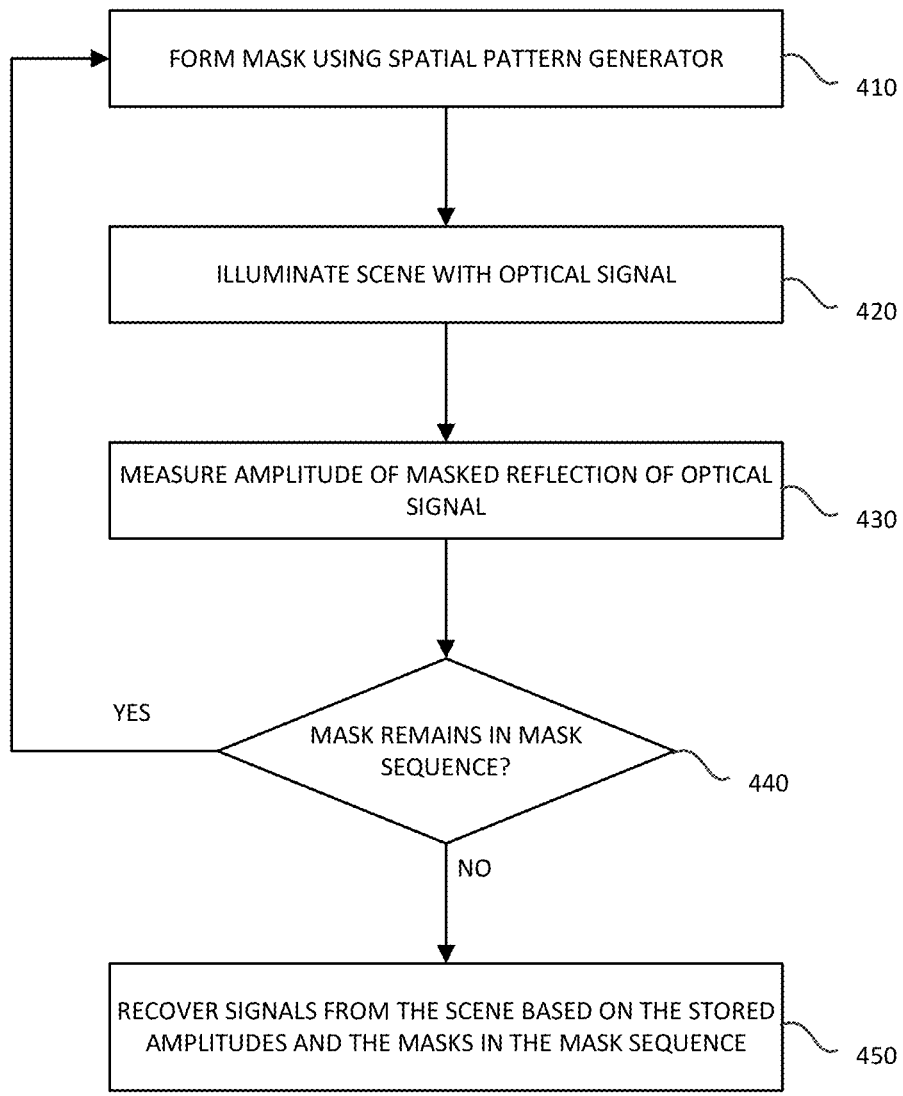
FIG. 4 is a flowchart illustrating a process for recovering an array of signals from a scene according to aspects of the subject technology.

FIG. 4 is a flowchart illustrating a process for recovering an array of signals from a scene according to aspects of the subject technology. For explanatory purposes, the blocks of the illustrated process are described herein as occurring in serial, or linearly. However, multiple blocks of the process may occur in parallel. In addition, the blocks of the process need not be performed in the order shown and/or one or more blocks of the process need not be performed and/or can be replaced by other operations.

As illustrated in FIG. 4, process 400 may begin by forming a mask using the spatial pattern generator (block 410). For example, the processor may instruct the pattern controller to form a mask from a mask sequence, where each mask in the sequence has a unique, pseudorandom pattern. With a mask formed using the spatial pattern generator, an optical signal is generated and used to illuminate a scene of interest (block 420). The scene reflects the optical signal according to the characteristics of the scene. The reflection of the optical signal is received and encoded using the mask formed by the spatial pattern generator. An amplitude of the masked reflection of the optical signal is measured, digitized, and stored for later processing (block 430). If a mask that has not been used yet to mask the reflection of the optical signal remains in the sequence of masks (block 440), the previous operations of forming a mask using the spatial pattern generator, illuminating the scene with an optical signal, and measuring, digitizing, and storing an amplitude of the masked reflection of the optical signal are repeated for the next mask in the mask sequence. If no unused masks remain in the mask sequence (block 440), an array of signals from the scene is recovered using a convex optimization algorithm based on the stored amplitudes and associated mask patterns as noted above (block 450).

The stored amplitude values and associated mask patterns represent signal data from a scene of interest captured and stored in a compressed form. The number of masks in the sequence masks and the associated amplitude values measured using the masks needed to recover the array of signals from the scene scale with the complexity of the scene. For example, scenes that are more sparse than other scenes may need fewer masks and associated amplitude values to recover the array of signals from the scene. The complexity of a scene may be estimated using a relatively small number (e.g., 10, 20, 30, etc.) of mask patterns and associated amplitude measurements and used to determine a number of masks in the sequence of masks described above with respect to FIG. 4 used to recover the array of signals from the scene.

Figure 5:
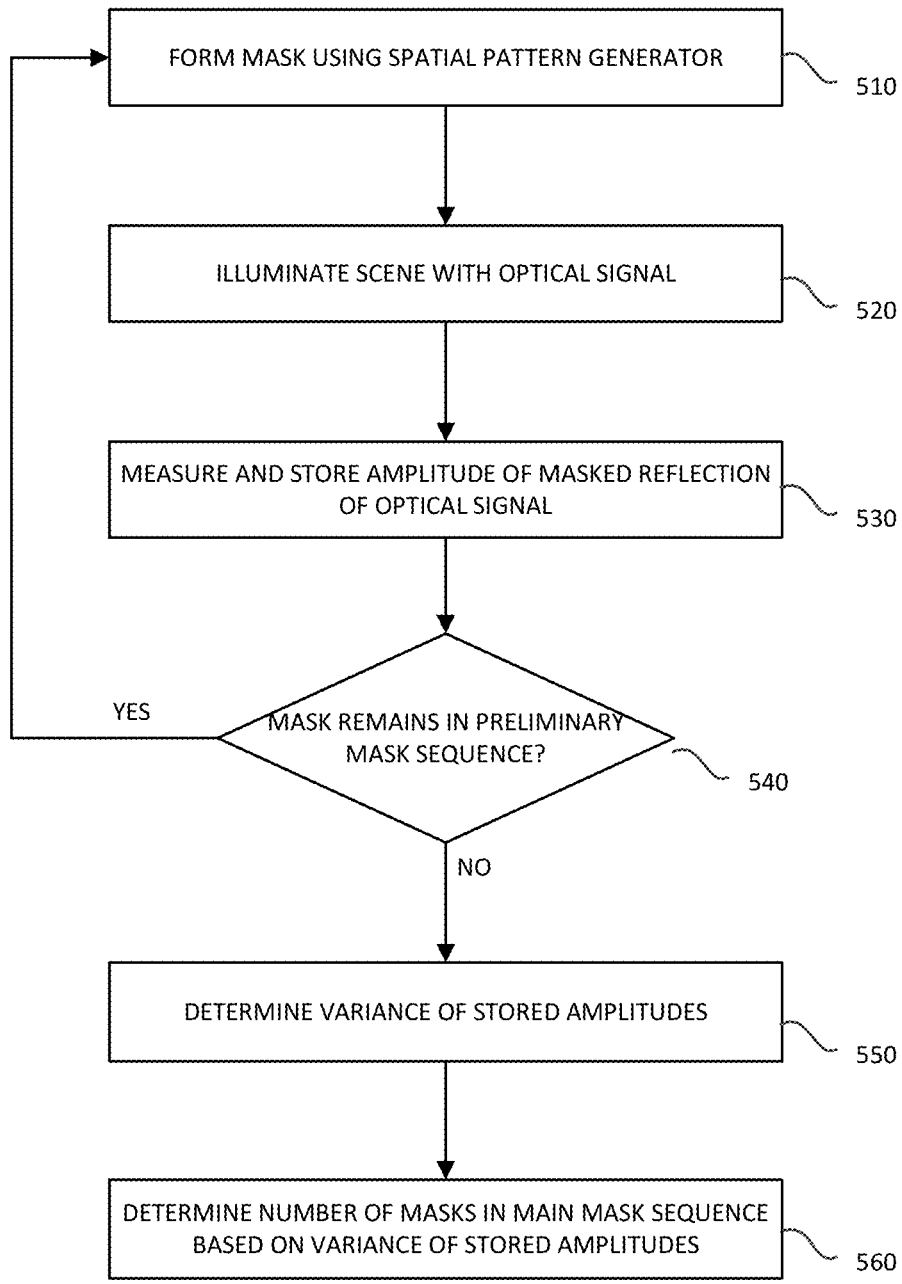
FIG. 5 is a flowchart illustrating a process for determining a number of masks to be used in a sequence of masks for recovering an array of signals from a scene according to aspects of the subject technology.

FIG. 5 is a flowchart illustrating a process for determining a number of masks to be used in a sequence of masks for recovering an array of signals from a scene according to aspects of the subject technology. For explanatory purposes, the blocks of the illustrated process are described herein as occurring in serial, or linearly. However, multiple blocks of the process may occur in parallel. In addition, the blocks of the process need not be performed in the order shown and/or one or more blocks of the process need not be performed and/or can be replaced by other operations.

As illustrated in FIG. 5, process 500 begins similar to process 400 by forming a mask using the spatial pattern generator (block 510). The processor may instruct the pattern controller to form the mask from a preliminary sequence of masks using the pixel elements of the spatial pattern generator according to a pattern. As this preliminary sequence of masks is being used to estimate the complexity of a scene, the resolution of these masks may be lower than the resolution of the masks described above in process 400. For example, groups of pixel elements (e.g., 10×10 pixel elements) in the spatial pattern generator may be controlled as single macro pixels to do a coarser analysis of the complexity of the scene.

With the mask formed by the spatial pattern generator, an optical signal is generated and used to illuminate the scene (block 520). A reflection of the optical signal from the scene is masked using the mask formed by the spatial pattern generator and an amplitude of the masked reflection is measured, digitized, and stored in association with the mask for later processing (block 530). If a mask that has not been used yet to mask the reflection of the optical signal remains in the preliminary sequence of masks (block 540), the previous operations of forming a mask using the spatial pattern generator, illuminating the scene with an optical signal, and measuring, digitizing, and storing an amplitude of the masked reflection of the optical signal are repeated for the next mask in the preliminary sequence of masks. If no unused masks remain in the preliminary sequence of masks (block 540), a variance of the stored amplitude values may be determined (block 550).

The variance of the stored amplitude values may be used to estimate the complexity of the scene. For example, the sparsity of a scene impacts the variance of the amplitude values. Sparse scenes lead to a higher variance of the stored amplitude values than the variance of stored amplitude values of reflections from a scene that is less sparse. The number of masks in the main sequence of masks used in process 400 above, may be determined based on the variance of the stored amplitude values measured using the preliminary sequence of masks (block 560). For example, a scaling law may be applied to the variance to determine the number of masks.

As indicated above, a scene metric such as entropy may be used in the convex optimization algorithm to recover the array of signals. The variance of the stored amplitude values measured using the preliminary sequence of masks may be used to select other scene metrics besides entropy for the convex optimization algorithm. For example, contrast ratio may be selected as the scene metric when the variance indicates that the scene may include glint or reflective targets that may wash out the scene. Other metrics may include, but are not limited to, range of reflectivity in the scene, noise floor in the scene, range extent in the scene, etc. In addition, resolution and/or precision of the amplitude measurements of the reflections of the optical signals may be selected based on scene characteristics indicated by the variance of the stored amplitude values. For example, a scene with a larger range extent may be better captured using measurements having a higher precision than that used for scenes with smaller range extents. Similarly, a scene with a relatively large amount of clutter, such as the canopy of a forest, may be better captured using measurements having a higher resolution than that used for scenes with less clutter.

Process 500 described above, allows operation of the active imaging/sensing system to be optimized for a given scene with prior knowledge of that scene. However, some characteristics of a scene or even the scene itself may be known beforehand. For example, it may be known that the scene is located in a city rather than a forest or even that the scene is in a previously imaged city. In these situations, prior measurements made when imaging cities or the particular previously imaged city may be used to generate a sequence of masks having a maximum amount of variation between the mask patterns. Amplitude values may be measured, digitized, and stored for reflections of an optical signal masked using this sequence of masks and a variance of the stored amplitude values may be determined. The determined variance may be used to determine the number of masks in the main sequence of masks similar to process 500. The determined variance may be compared to the variance determined from the prior measurements to verify the determined number of masks in the main sequence of masks. This sequence of masks may be smaller than the preliminary sequence of masks used in process 500, which may allow the process of determining the number of masks in the main sequence of masks to be completed more quickly than done using process 500.

Figure 6:
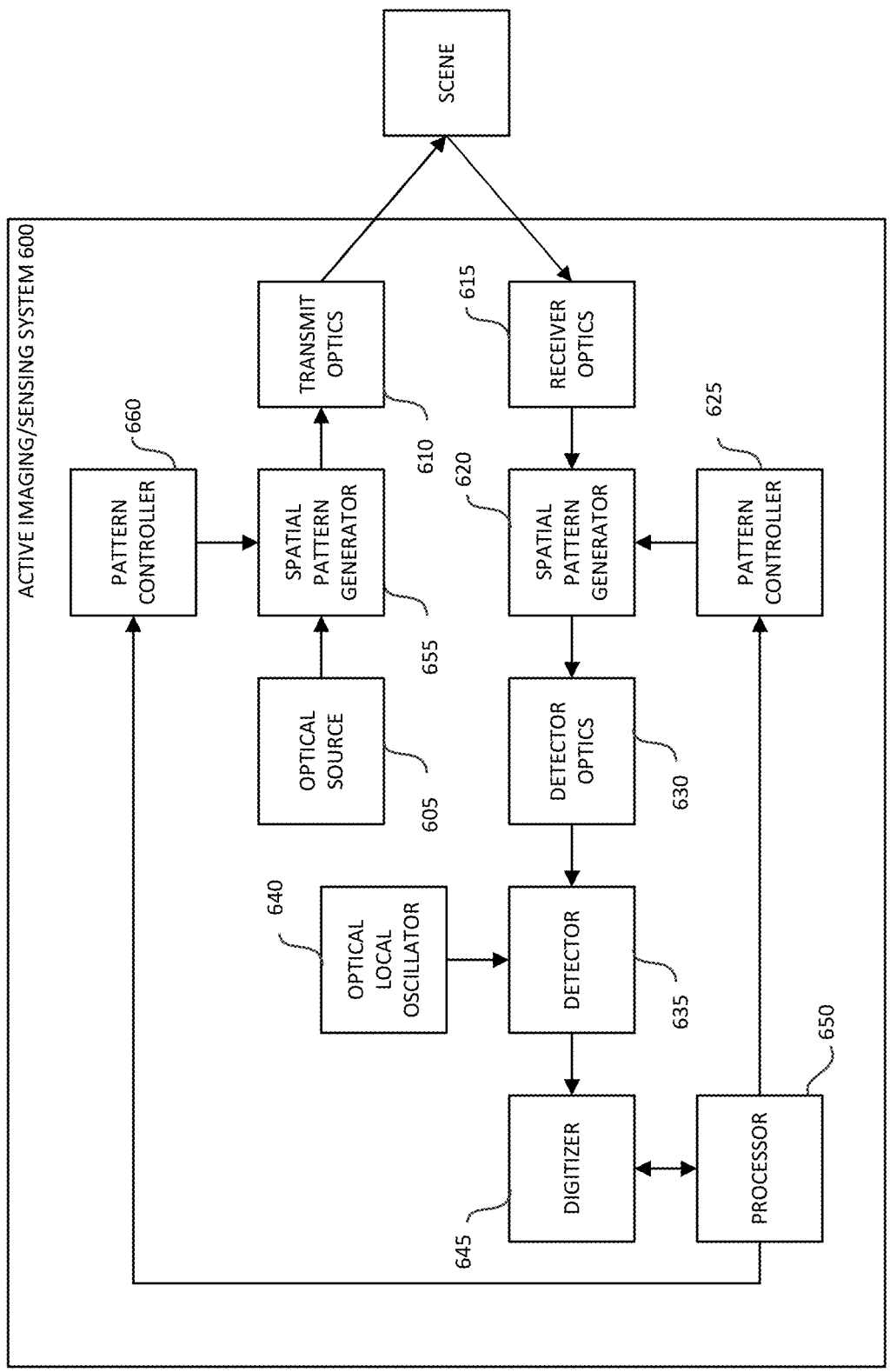
FIG. 6 is a block diagram illustrating components of an active imaging/sensing system according to aspects of the subject technology.

FIG. 6 is a block diagram illustrating components of an active imaging/sensing system according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections between components are not limited to direct connections and may be implemented with one or more intervening components.

As depicted in FIG. 6, active imaging/sensing system 600 includes optical source 605, transmit optics 610, receiver optics 615, spatial pattern generator 620, pattern controller 625, detector optics 630, detector 635, optical local oscillator 640, digitizer 645, and processor 650. The configurations and operations of these components align with the configurations and operations of the corresponding components described above with respect to FIG. 2 and will not be repeated here.

Unlike active imaging/sensing system 200 depicted in FIG. 2, active imaging/sensing system 600 includes spatial pattern generator 655 and pattern controller 660 arranged in a transmit path of optical source 605. Similar to the configuration and operation of spatial pattern generator 220 and pattern controller 225 described above, spatial pattern generator 655 and pattern controller 660 may be configured to form a mask by pattern controller 660 controlling an array of pixel elements of spatial pattern generator 655 individually based on a mask pattern provided or identified by processor 650. One or more masks may be formed using spatial pattern generator 655 to spatially encode the optical signal generated by optical source 605 before the optical signal is used to illuminate the scene.

Active imaging/sensing system 600 may be configured to apply different combinations of masks formed using spatial pattern generator 620 and spatial pattern generator 655. For example, for each of one or more masks formed using spatial pattern generator 655 to spatially encode the optical signal before illuminating the scene, multiple masks may be formed using spatial pattern generator 620 and corresponding amplitudes of the masked reflections of the optical signal may be measured, digitized, and stored. The sequence of masks formed using spatial pattern generator 655 may be the same or may be different from the sequence of masks formed using spatial pattern generator 620. The two sequences of masks may include different masks and/or the same masks arranged in a different order.

Figure 7:
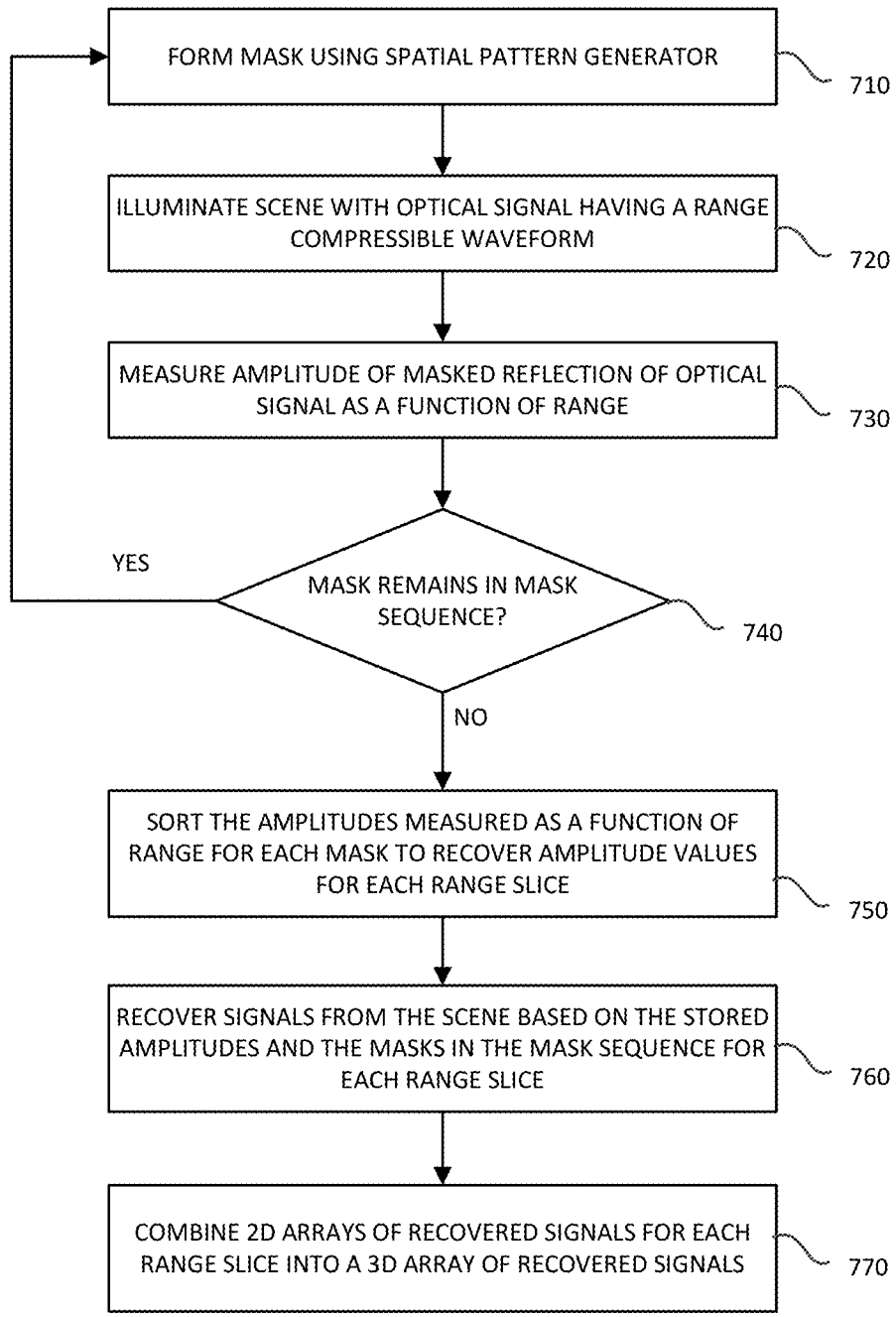
FIG. 7 is a flowchart illustrating a process for recovering a three-dimensional array of signals from a scene according to aspects of the subject technology.

According to aspects of the subject technology, the array of signals recovered from the scene may be a three-dimensional array of signals representing three-dimensional aspects of the illuminated scene, such as depth of the scene relative to the active imaging/sensing system. FIG. 7 is a flowchart illustrating a process for recovering a three-dimensional array of signals from a scene according to aspects of the subject technology. For explanatory purposes, the blocks of the illustrated process are described herein as occurring in serial, or linearly. However, multiple blocks of the process may occur in parallel. In addition, the blocks of the process need not be performed in the order shown and/or one or more blocks of the process need not be performed and/or can be replaced by other operations.

Similar to process 400 described above, process 700 may begin by forming a mask using the spatial pattern generator (block 710). For example, the processor may instruct the pattern controller to form a mask from a mask sequence, where each mask in the sequence has a unique, pseudo-random pattern. With a mask formed using the spatial pattern generator, an optical signal is generated and used to illuminate a scene of interest (block 720). The generated optical signal may be modulated using a range compressible waveform that provides range resolution. For example, the range compressible waveform may be a pulse waveform or a chirp waveform.

The scene reflects the generated optical signal, and amplitudes of the reflection of the optical signal encoded by the mask pattern generated using the spatial pattern generator may be measured, digitized, and stored as a function of range (block 730). For example, when using a pulse waveform to modulate the optical signal, the amplitudes may be measured as a function of time. As another example, when using a chirp waveform the amplitudes may be measured as a function of frequency. In this manner, multiple amplitudes are measured, digitized, and stored for each mask pattern. If a mask that has not been used yet to mask the reflection of the optical signal remains in the sequence of masks (block 740), the previous operations of forming a mask using the spatial pattern generator, illuminating the scene with an optical signal having a range compressible waveform, and measuring, digitizing, and storing an amplitude of the masked reflection of the optical signal as a function of range are repeated for the next mask in the mask sequence.

If no unused masks remain in the mask sequence (block 740), the amplitudes measured, digitized, and stored as a function of range are sorted to recover amplitude values corresponding to each range slice (block 750). A 2D array of signals from the scene may be recovered for each range slice using a convex optimization algorithm based on the stored amplitudes for the range slice and associated mask patterns (block 760). The 2D arrays of recovered signals may then be combined into a volumetric data cube or 3D array of recovered signals from the scene (block 770).

According to aspects of the subject technology, additional processing of the recovered signals may be performed by the processor. For example, a noise threshold value may be set and recovered signals that do not satisfy the noise threshold may be discarded from the array of recovered signals. As another example, median filtering may be applied to the recovered signals in each of the 2D arrays of signals and/or in the 3D array of signals.

Figure 8:
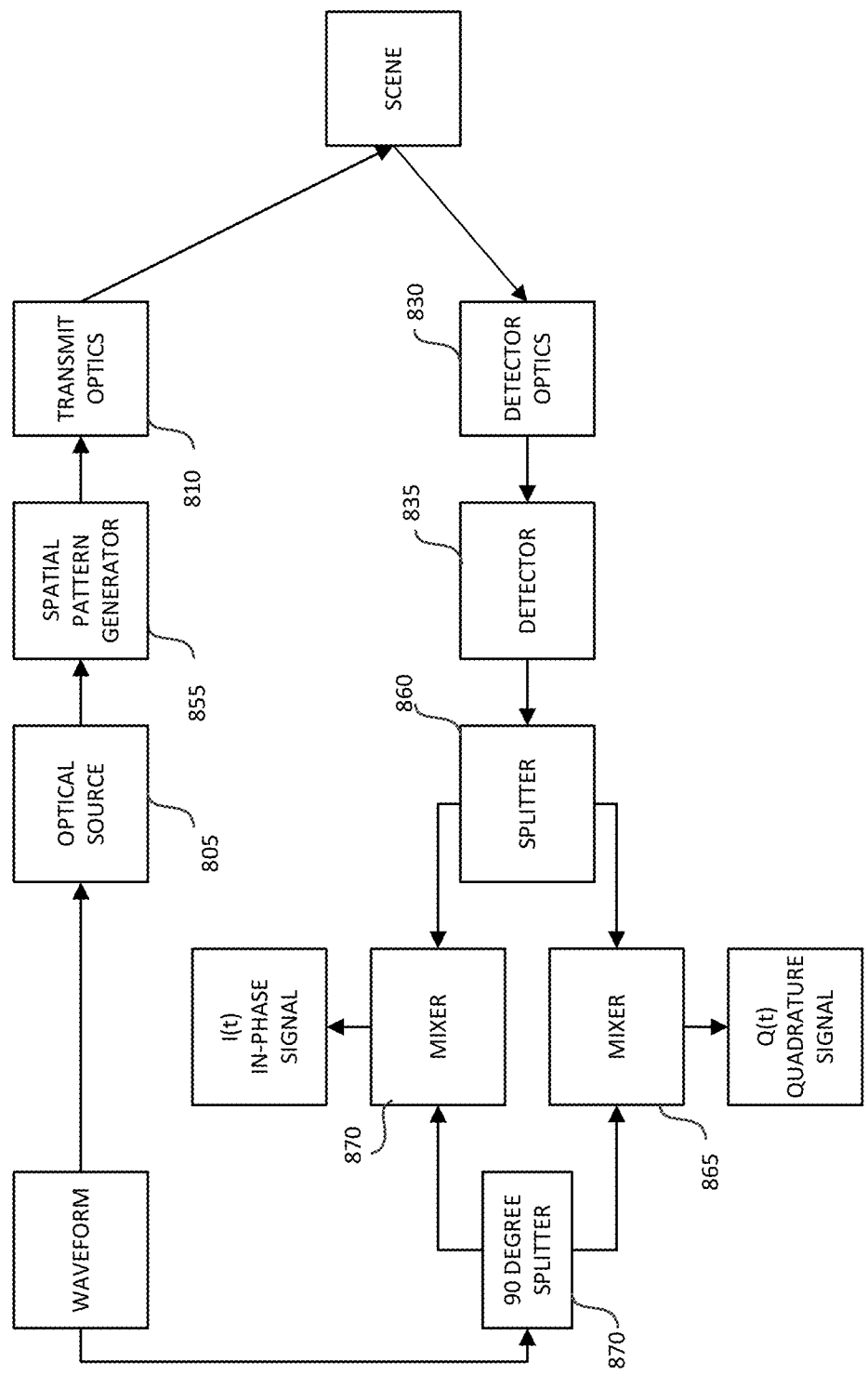
FIG. 8 is a block diagram depicting components of an active imaging/sensing system configured to measure amplitude and phase of a reflected optical signal according to aspects of the subject technology.

In the examples described above, the amplitude of the reflected optical signal is measured. According to aspects of the subject technology, both the amplitude and the phase of the reflected optical signal may be measured, digitized, stored. Both the amplitude and the phase may be used in recovering the array of signals from the scene. FIG. 8 is a block diagram depicting components of an active imaging/sensing system configured to measure amplitude and phase of a reflected optical signal according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections between components are not limited to direct connections and may be implemented with one or more intervening components.

As depicted in FIG. 8, active imaging/sensing system 800 includes optical source 805, spatial pattern generator 855, transmit optics 810, detector optics 830, and detector 835. The configurations and operations of these components align with the configurations and operations of the corresponding components described above with respect to FIG. 3 and FIG. 6, and will not be repeated here. Unlike the systems depicted in FIG. 3 and FIG. 6, active imaging/sensing system 800 includes splitter 860 coupled to detector 835 and configured to split an amplitude signal received from detector 835 generated by measuring the amplitude of the reflection of the optical signal from the scene. The amplitude signal may be split between mixer 865 and mixer 870, which are configured to mix the amplitude signal with a waveform used to modulate the optical signal generated by optical source 805 and that waveform with a 90-degree phase shift, respectively, generated by 90-degree splitter 870.

Mixer 865 may output a quadrature signal Q(t) corresponding to the amplitude signal and mixer 870 may output an in-phase signal I(t) corresponding to the amplitude signal. The quadrature signal and the in-phase signal may be used to recover the amplitude and the phase of the amplitude signal, where the amplitude A(t) is equal to the square root of $(I^2+Q^2)$, and where the phase $\Phi(t)$ is equal to the arctan (I/Q). The amplitude and phase of the amplitude signal provide by detector 835 may be digitized using digitizers (not shown) and stored for later processing.

Figure 9:
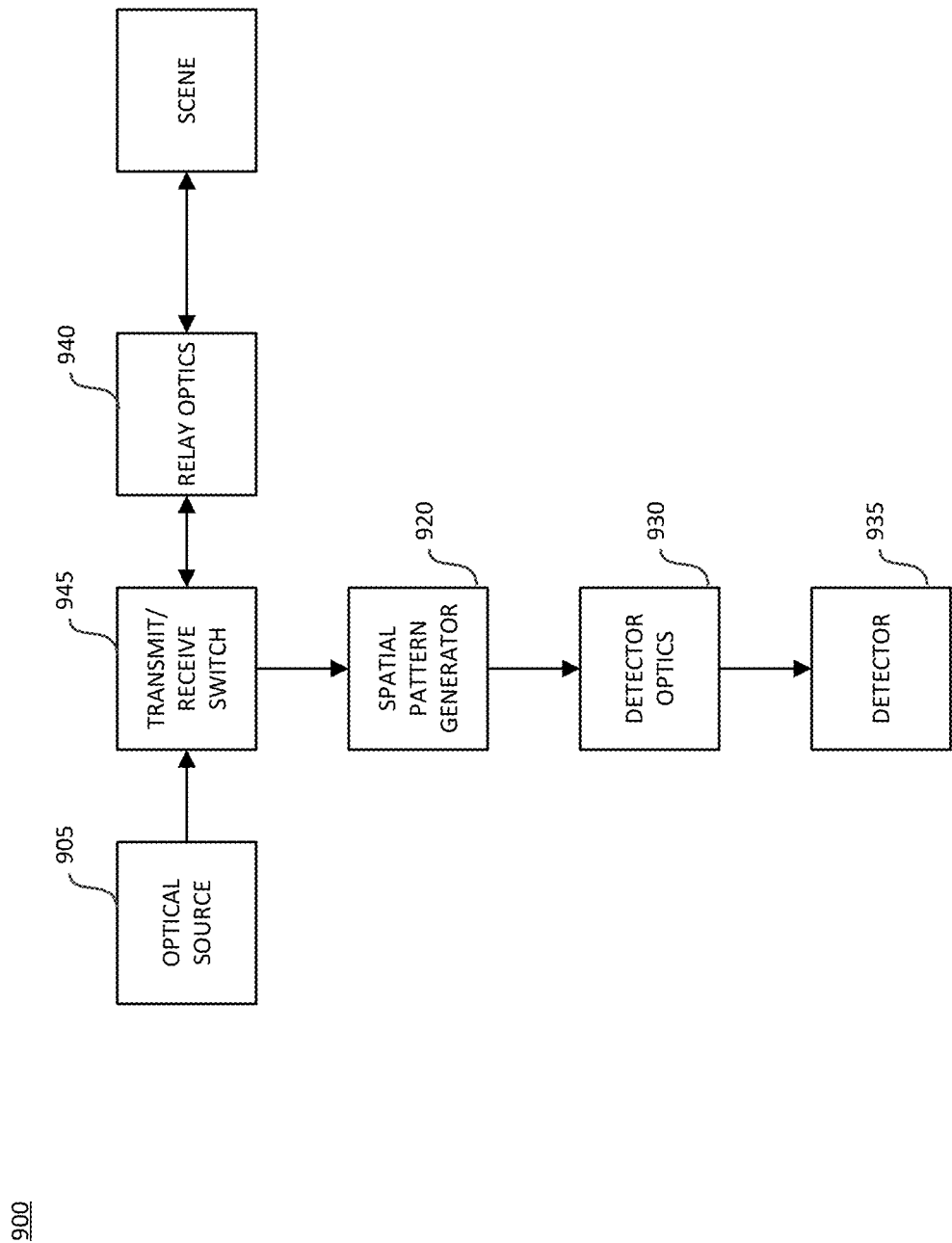
FIG. 9 is a block diagram illustrating components of an active imaging/sensing system in a mono-static configuration according to aspects of the subject technology.

The examples above describe bi-static implementations of the active imaging/sensing systems where the transmit path used to illuminate the scene with an optical signal and the receive path used to receive reflections of the optical signal for detection are separate paths with their own respective optics. The subject technology is not limited to bi-static implementations and may be implemented using a mono-static configuration. FIG. 9 is a block diagram illustrating components of an active imaging/sensing system in a mono-static configuration according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections between components are not limited to direct connections and may be implemented with one or more intervening components.

As depicted in FIG. 9, active imaging/sensing system 900 includes optical source 905, spatial pattern generator 920, detector optics 930, and detector 935. The configurations and operations of these components align with the configurations and operations of the corresponding components described above with respect to FIG. 2 and FIG. 6 and will not be repeated here. Active imaging/sensing system 900 in FIG. 9 share relay optics 940 used for both illuminating the scene with an optical signal generated by optical source 905 and receiving a reflection of the optical signal from the scene. Active imaging/sensing system 900 may be configured to switch between illuminating the scene using an optical signal generated by optical source 905 and receiving the reflection of the optical signal from the scene for encoding by spatial pattern generator 920 and measurement by detector 935 using transmit/receive switch 945. Transmit/receive switch 945 may be controlled by the processor (not shown) and implemented using, but not limited to, a polarizing beamsplitter with waveplates or a Faraday rotator. Active imaging/sensing system 900 may incorporate a spatial pattern generator between optical source 905 and transmit/receive switch 945 to implement transmit encoding of the optical signal generated by optical source prior to illuminated the scene with the optical signal.

The scene that is illuminated and for which the array of signals is recovered based on reflections from the scene may be located a significant distance from the active imaging/sensing system. For example, the active imaging/sensing system may be incorporated into a satellite for imaging or sensing scenes on the surface of the Earth. Aligning components of the active imaging/sensing system such as the spatial pattern generator with the receiver optics may be incredibly difficult if the distant scene is used to align and space the components so that everything is in focus. According to aspects of the subject technology, an alignment system using a local imaging target to align and space the components may be incorporated into the active imaging/sensing system.

Figure 10:
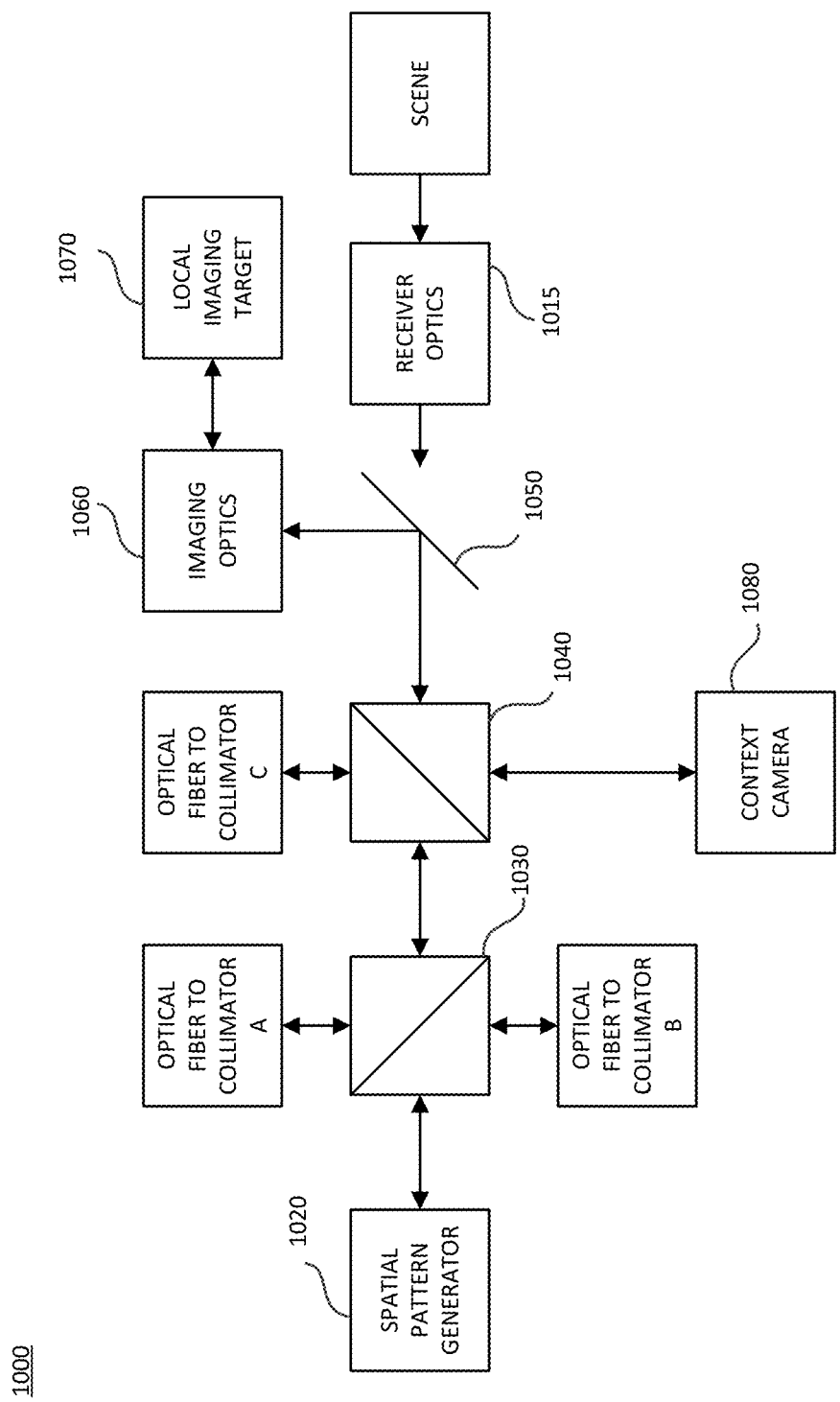
FIG. 10 is a block diagram depicting components of an alignment system according to aspects of the subject technology.

FIG. 10 is a block diagram depicting components of an alignment system according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections between components are not limited to direct connections and may be implemented with one or more intervening components.

As depicted in FIG. 10, alignment system 1000 includes receiver optics 1015 arranged to receive reflections of optical signals from the scene and focus the reflections of the optical signals on spatial pattern generator 1020 to be spatially encoded using a mask pattern formed using pixel elements of spatial pattern generator 1020 as discussed above with respect to FIG. 2, for example. Alignment system 1000 depicted in FIG. 10 further includes optical fiber to collimator A, optical fiber to collimator B, optical fiber to collimator C, beam splitter 1030, beam splitter 1040, temporary mirror 1050, imaging optics 1060, local imaging target 1070, and context camera 1080.

According to aspects of the subject technology, optical fiber to collimator A is arranged to couple into optical fiber to collimator B and into optical fiber to collimator C via beam splitter 1030 and beam splitter 1040. The coupling of these elements may be at a relatively high efficiency such as greater than 80%. Light from optical fiber to collimator B may be used to illuminate spatial pattern generator 1020. Temporary mirror 1050 may be positioned in the optical path between receiver optics 1015 and spatial pattern generator 1020 to redirect the light illuminating and being reflected by spatial pattern generator 1020 onto local imaging target 1070 via imaging optics 1060. Imaging optics 1060 may include one or more lenses, mirrors, apertures, collimators, etc. Imaging optics 1060 may be adjusted to focus the light reflected by spatial pattern generator onto local imaging target 1070. The focus of the light on local imaging target 1070 may be confirmed using a reference camera (not shown).

Context camera 1080 may be arranged in a position to image local imaging target 1070 such that local imaging target 1070 is in focus for context camera 1080. In this manner, context camera 1080 and spatial pattern generator 1020 are arranged the same optical distance from local image target 1070 on a common image plane. After context camera 1080 is positioned relative to local imaging target 1070, temporary mirror 1050 may be removed from the optical path between receiver optics 1015 and spatial pattern generator 1020, thereby allowing context camera 1080 to view the scene via receiver optics 1015 and beam splitter 1040 with light from optical fiber to collimator C serving as a center reference for context camera 1080. Beam splitter 1040 may be a dichroic beam splitter to allow context imaging wavelengths to be different from wavelengths of the measured reflections of an optical signal used to illuminate the scene.

Receiver optics 1015 (e.g., a telescope) may be adjusted for a particular scene of interest for which an array of signals is to be recovered. Receiver optics 1015 may be adjusted so that the scene of interest is in focus for context camera 1080. With context camera 1080 arranged on a common image plane with spatial pattern generator 1020, any adjustments to receiver optics 1015 to bring the scene of interest into focus for context camera 1080 also bring the scene of interest into focus on spatial generator 1020.

Systems incorporating active imaging/sensing systems may have design constraints on optical signal transmission and reception as well as the size and capabilities of optics involved in the transmission and/or reception of the optical signals. In addition, increasing an aperture size may result in new problems due to turbulence that may require complicated adaptive optical systems to address. The subject technology provides for the use of multiple smaller apertures in the transmit and receive optical paths in place of a single larger aperture.

Figure 11:
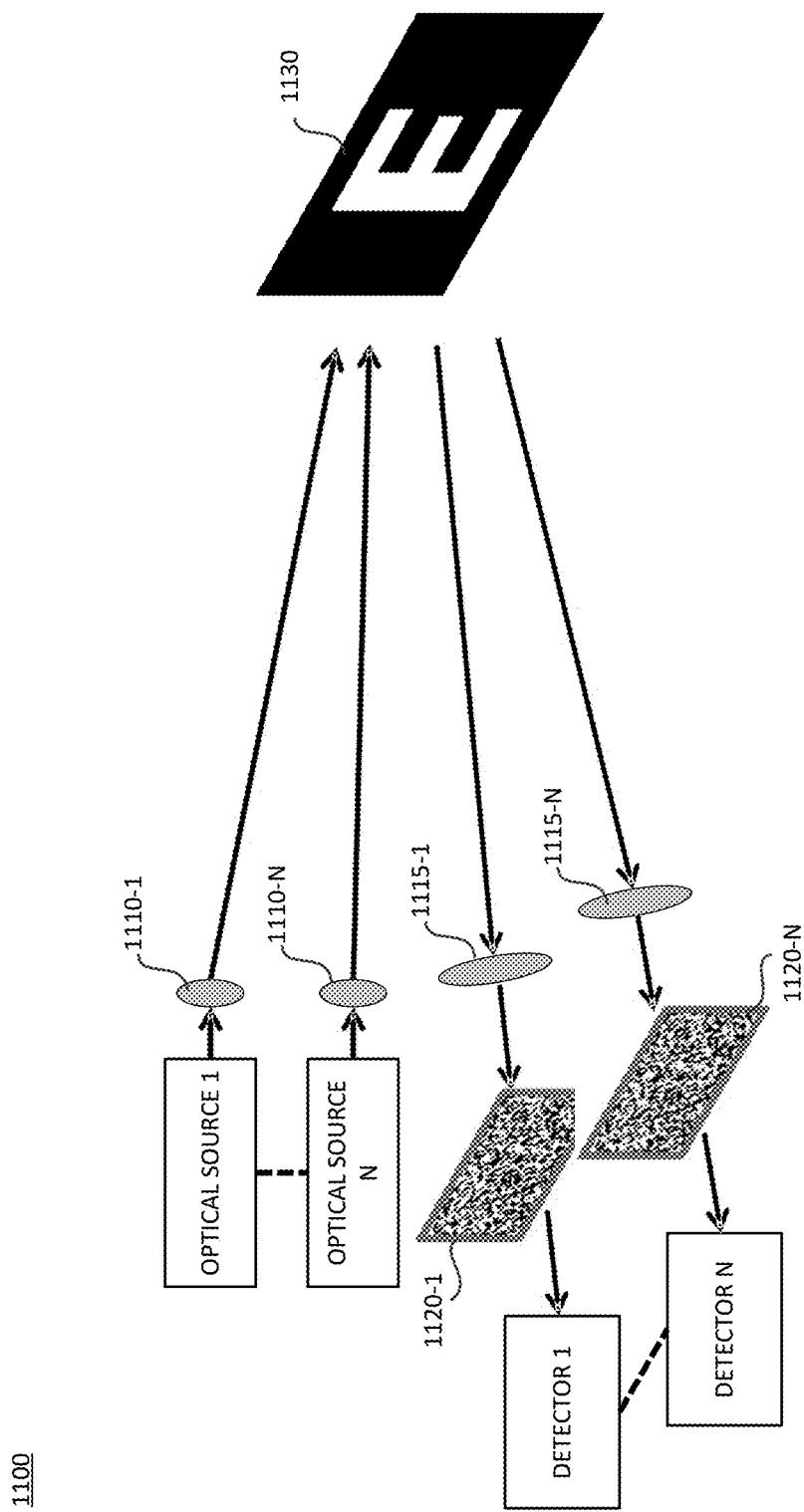
FIG. 11 is a diagram illustrating components of a multi-aperture active imaging/sensing system according to aspects of the subject technology.

FIG. 11 is a diagram illustrating components of a multi-aperture active imaging/sensing system according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections between components are not limited to direct connections and may be implemented with one or more intervening components.

Multi-aperture active imaging/sensing system 1100 depicted in FIG. 11 may include multiple transmitters and multiple receivers. Each of the transmitters may include an optical source (e.g., optical sources 1-N) configured to generate an optical signal and illuminate a scene 1130 with the optical signal via respective transmit optics (e.g., transmit optics 1110-1 to 1110-N) each having an aperture. Each of the receivers may include receiver optics (e.g., receiver optics 1115-1 to 1115-N) having an aperture and configured to receive reflections of the optical signals used to illuminate the scene and focus the reflections of the optical signals on a respective spatial pattern generator (e.g., spatial pattern generators 1120-1 to 1120-N) to be encoded or masked with mask patterns formed using the spatial pattern generator. Each of the receivers may further include a detector (e.g., detector 1 to detector N) configured to measure an amplitude of the reflection of the respective encoded or masked optical signal. Multi-aperture active imaging/sensing system 1100 also may include pattern controllers (not shown) coupled to respective ones of the spatial pattern generators and digitizers (not shown) coupled to respective ones of the detectors. A processor (not shown) may be coupled to the pattern controllers and configured to instruct the pattern controllers to form mask patterns using the respective spatial pattern generators. The processor also may be coupled to the digitizers to receive or read out digitized amplitude values measured by the respective detectors. The subject technology is not limited to any particular number of transmitters or receivers.

The amplitude signals generated by the receivers may be combined either coherently or incoherently. For example, if the detectors are operating in a coherent detection mode, the amplitude signals from each receiver may be added incoherently to mitigate speckle. Combining the amplitude signals incoherently may result in an averaging of the amplitude signals, which reduces speckle variations. Operation of multi-aperture active imaging/sensing system 1100 may be optimized by setting the optical sources in the transmitters based on signal diversity requirements (e.g., wavelengths of the optical signals are separated sufficiently for speckle diversity) and measuring the amplitudes of the reflections of the optical signals encoded using a partial sequence of masks. The variance of the measured amplitudes may be determined and used to evaluate the effectiveness of the signal diversity requirements. The waveforms used to generate the optical signals may be optimized based on the measured amplitude values and the mask patterns used to encode the reflections of the optical signals. Once optimized, amplitudes of the reflections of the optical signals may be measured using the full sequence of masks.

According to aspects of the subject technology, an active imaging/sensing system using coherent detection may use each mask in a mask sequence to encode multiple optical signals reflected by a scene and average the amplitude values measured for each mask to mitigate multiplicative noise such as speckle. Increasing the number of amplitude values that are measured and averaged for each mask may increase the fidelity of the amplitude values used to recover the array of signals. However, spending more of an energy and/or time budget to collect more amplitude values for each mask may require fewer masks to be used in the overall process which may negatively impact the recovery of the array of signals from the scene. The optimal balance of the number of amplitude values to average for each mask and the total number of masks to use in the process will vary depending on scene and target characteristics.

Figure 12:
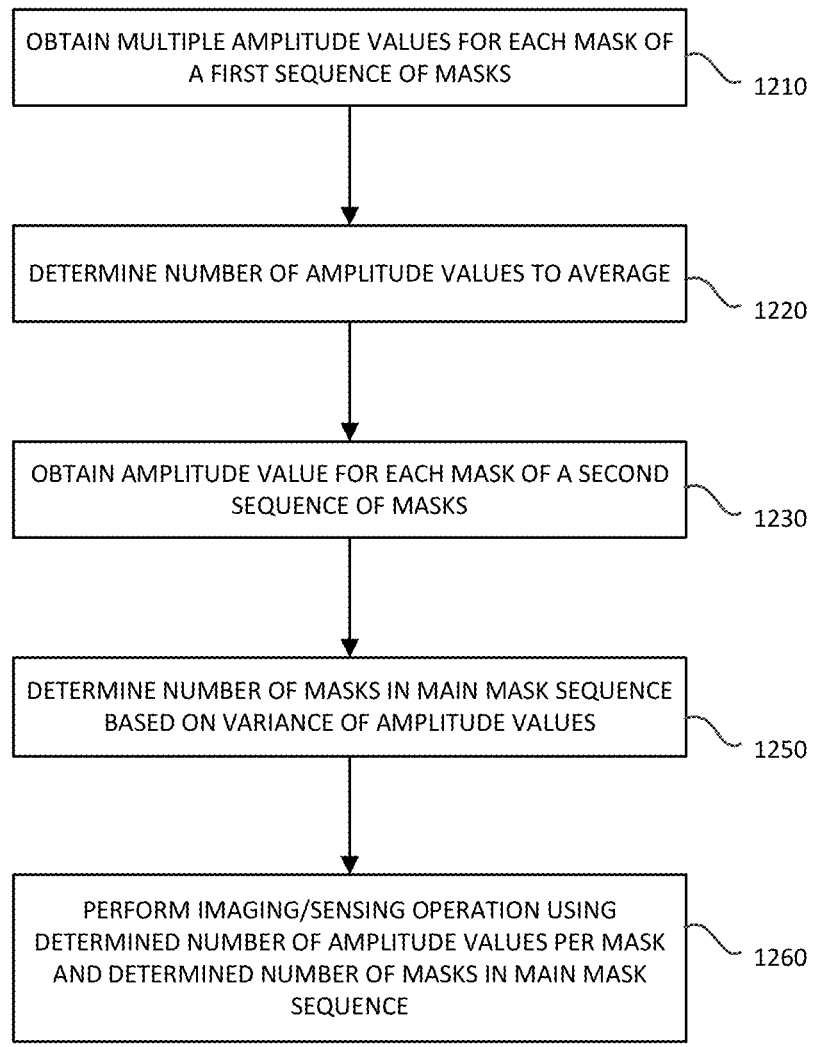
FIG. 12 is a flowchart illustrating a process for optimizing a number of amplitude values to average and a number of masks to use in recovering an array of signals from a scene according to aspects of the subject technology.

FIG. 12 is a flowchart illustrating a process for optimizing a number of amplitude values to average and a number of masks to use in recovering an array of signals from a scene according to aspects of the subject technology. For explanatory purposes, the blocks of the illustrated process are described herein as occurring in serial, or linearly. However, multiple blocks of the process may occur in parallel. In addition, the blocks of the process need not be performed in the order shown and/or one or more blocks of the process need not be performed and/or can be replaced by other operations.

According to aspects of the subject technology, a resolution and field-of-regard for an area to be searched may be specified to determine a number of scene pixels (e.g., 1,000×1,000) for an imaging/sensing operation of that area. For each mask in a first sequence of pseudorandom masks (e.g., 10 masks), the processes described above with respect to blocks 410, 420, and 430 are repeated multiple times (e.g., 30 times) to obtain multiple amplitude values for each of the masks (block 1210). The collection of amplitude values may be used to determine speckle characteristics. For example, the collection of amplitude values may show a distribution function for speckle that may be used to determine an optimal number of amplitude values (e.g., four to eight amplitude values per mask) to average to balance performance with the need to mitigate speckle (block 1220).

Similar to the process described above with respect to FIG. 5, an amplitude value is measured, digitized, and stored for each mask of a second sequence of pseudorandom masks (e.g., 500 masks) (block 1230) and a number of masks for a main sequence of pseudorandom masks (e.g., 60,000 masks) is determined based on a variance of the amplitude values (block 1250). The imaging/sensing operation described above with respect to FIG. 4 is then performed using the determined number of masks in the main sequence of masks with the variation of illuminating the scene and measuring the amplitude of the masked reflection the number of determined times for each mask and averaging those amplitude values to use as the amplitude value for the mask when recovering the signals from the scene (block 1260). In the example of 1,000×1,000 scene elements and averaging four amplitude values to mitigate speckle, the conventional sensor would require 4 million measurements (1 million pixels each measured four times for averaging) compared to 240,000 measurements (60,000 masks with four amplitude values measured for each mask) using the subject technology.

For a static scene and relative pose, the processing from multiple measurements to cover the scene relies on balancing the measurements to provide an accurate measurement of the amplitude for a given projection. For situations where there is relative motion of the entire scene, pose, or objects within the scene, an iterative processing method may be combined with a sharpness metric based on a desired scene parameter (e.g., entropy of the scene) to successively update a motion estimate. While not necessary, it may be useful to use a decreased spatial and range resolution to rapidly determine the initial estimate. As with many nested optimization computations, the starting estimate determines the time it takes to converge on the solution. For the example outlined below, a scene is first sampled with a reduced resolution in all dimensions to limit the number of pixels. The component of the motion vectors in range may be determined by measuring the amplitude with a small sequence of projections where the spatial amplitude is decreased by making the macro-pixels larger by grouping multiple pixels in the pseudo-random projections together as macro-pixels.

For an example where a 1,000×1,000 element scene is to be measured, the scene may first be mapped into 250×250 pixels. In addition, a range resolution may be decreased by 4× to maintain commensurate voxel scaling, which may increase the signal-to-noise ratio. A small sequence of patterns/masks (e.g., 30), may be used to measure scene complexity. Measuring this small sequence of patterns twice at two different times provides an estimate of the scene complexity and global motion for an initial global estimator. Depending on the scene and motion complexity, the amplitude measurements obtained using the small sequence of patterns/masks may be used to determine the number of projections or masks in the main sequence of masks (e.g., 4,000) to recover the array of signals of the scene. Amplitude measurements using the determined main sequence of masks may be repeated at separate times based on the global estimator to determine the motion within the macro-pixels. The two sequences of data may be first processed separately using a sharpness metric and a pixel-by-pixel update to the motion estimator. The data from each sequence may then used to provide a full vector for the pixel-by-pixel motion estimate. The data from each pixel may then used as the starting estimate for the higher resolution measurements. Those measurements are then collected and processed the same way as this lower resolution example. The resulting image/array of signals will have a sharp scene recovered with full vector motion of each element recovered with significantly fewer measurements than a traditional imaging/sensing system.

According to aspects of the subject technology, a system is provided that includes an optical source configured to generate an optical signal and illuminate a scene with the optical signal via transmit optics, a first spatial pattern generator comprising a first plurality of pixel elements, wherein the first spatial pattern generator is configured to form a mask, using the first plurality of pixel elements, to mask a reflection of the optical signal from the scene received via receiver optics, a first pattern controller coupled to the first spatial pattern generator and configured to control the first plurality of pixel elements individually to form the mask, a detector configured to measure an amplitude of the masked reflection of the optical signal received via detector optics, and a digitizer coupled to the detector and configured to digitize the measured amplitude into an amplitude value. The system further includes a processor coupled to the first pattern controller and the digitizer. The processor is configured to instruct the first pattern controller to form a first sequence of masks to sequentially mask reflections of the optical signal using the first spatial pattern generator, store the amplitude value corresponding to the measured amplitude of the masked reflection of the optical signal for each mask in the first sequence of masks, and recover an array of signals from the scene based on the stored amplitude values and the first sequence of masks, wherein a number of the stored amplitude values and a number of masks in the first sequence of masks is less than a number of signals of the array of signals.

The recovered array of signals from the scene comprises an image of the scene. The processor may be further configured to instruct the first pattern controller to form a second sequence of masks to sequentially mask the reflection of the optical signal using the first spatial pattern generator, store the amplitude value corresponding to the measured amplitude of the masked reflection of the optical signal for each mask in the second sequence of masks, determine a variance of the amplitude values stored for the second sequence of masks, and determine the number of masks in the first sequence of masks based on the variance of the amplitude values. The number of masks in the first sequence of masks may be greater than a number of masks in the second sequence of masks. A resolution of the masks in the first sequence of masks may be greater than a resolution of the masks in the second sequence of masks.

The system may further include an optical local oscillator configured to provide a local oscillator signal to the detector, wherein the detector is configured to measure the amplitude of the masked reflection of the optical signal using coherent detection. The system may further include an optical splitter configured to split the local oscillator signal together with the masked reflection of the optical signal and to provide the split signals to the detector, wherein the detector is a balanced detector. The detector may be configured to operate in a direct, linear mode or in a Geiger mode. The first spatial pattern generator may be a micro electromechanical system array of micromirror devices.

The system may further include a context camera aligned to a common image plane with the first spatial pattern generator, and a beam splitter positioned in an optical path between the receiver optics and the spatial pattern generator, wherein the beam splitter may be configured to split the reflection of the optical signal received via the receiver optics between the context camera and the first spatial pattern generator, and wherein the receiver optics may be adjustable using the context camera to confirm focus of the reflection of the optical signal on the first spatial pattern generator.

The system may further include a second spatial pattern generator comprising a second plurality of pixel elements, wherein the second spatial pattern generator is configured to form a mask, using the second plurality of pixel elements, to mask the optical signal generated by the optical source before illuminating the scene, and a second pattern controller coupled to the second spatial pattern generator and configured to control the second plurality of pixel elements individually to form the mask. The processor may be further coupled to the second pattern controller and may be further configured to instruct the second pattern controller to form one or more masks to mask the optical signal generated by the optical source using the second spatial pattern generator, wherein the stored amplitude values include amplitude values corresponding to the measured amplitudes of the masked reflections of the masked optical signal masked using the sequence of masks formed by the first spatial pattern generator for each of the one or more masks formed by the second spatial pattern generator.

The system may further include a first mixer, a second mixer, a splitter configured to split a signal containing the amplitude measured by the detector between the first mixer and the second mixer, and a 90-degree splitter configured to split a waveform signal used by the optical source to generate the optical signal between the first mixer and the second mixer with a 90-degree phase shift between the split waveform signal provided to the first mixer and the split waveform signal provided to the second mixer. The first mixer may be configured to mix the split signal containing the amplitude and the split waveform signal to generate an in-phase signal. The second mixer may be configured to mix the split signal containing the amplitude and the spit waveform signal with the 90-degree phase shift to generate a quadrature signal. The processor may be further configured to recover the amplitude and the phase of the signal containing the amplitude measured by the detector based on the in-phase signal and the quadrature signal.

The receiver optics and the transmit optics may be a common set of optics, wherein the system may further include an optical switch positioned in an optical path between the common set of optics and the optical source and an optical path between the common set of optics and the first spatial pattern generator, and wherein the optical switch may be operable to switch between passing the optical signal generated by the optical source to illuminate the scene via the common set of optics, and passing the reflection of the optical signal from the scene received via the common set of optics to the first spatial pattern generator.

The system may further include a plurality of optical sources configured to generate respective optical signals and illuminate the scene with the optical signals via respective transmit optics, a plurality of first spatial pattern generators each comprising a respective first plurality of pixel elements, wherein each first spatial pattern generator is configured to form a respective mask, using the first plurality of pixel elements, to mask a reflection of the optical signal from the scene received via respective receiver optics, a plurality of first pattern controllers coupled to the plurality of first spatial pattern generators, respectively, and configured to control the respective first plurality of pixel elements individually to form the masks, a plurality of detectors configured to measure amplitudes of the respective masked reflections of the optical signals received via respective detector optics, and a plurality of digitizers coupled to the plurality of detectors, respectively, and configured to digitize the respective measured amplitudes into respective amplitude values. The processor may be coupled to each of the plurality of first pattern controllers and to each of the plurality of digitizers. The processor may be further configured to instruct the plurality of first pattern controllers to form respective first sequences of masks to sequentially mask respective reflections of the optical signals using the plurality of first spatial pattern generators, store the amplitude values corresponding to the measured amplitudes of the respective masked reflections of the respective optical signals for each mask in the first sequence of masks formed by the plurality of first spatial pattern generators, and recover signals from the scene based on the stored amplitude values and the first sequence of masks.

According to aspects of the subject technology, a method is provided that includes, for each mask in a first sequence of masks, generating an optical signal and illuminating a scene with the optical signal, forming the mask using a plurality of pixel elements of a first spatial pattern generator to mask a reflection of the optical signal from the scene, and measuring an amplitude of the masked reflection of the optical signal. An array of signals is recovered from the scene based on the measured amplitudes and the first sequence of masks, wherein a number of the measured amplitudes and a number of masks in the first sequence of masks is less than a number of signals in the array of signals.

The method may further include for each mask in a second sequence of masks, generating the optical signal and illuminate the scene with the optical signal, forming the mask using the plurality of pixel elements of the first spatial pattern generator, and measuring the amplitude of the masked reflection of the optical signal. A variance of the measured amplitudes may be determined and the number of masks in the first sequence of masks may be determined based on the determined variance of the measured amplitudes. A number of masks in the second sequence of masks may be less than the number of masks in the first sequence of masks. The array of signals may be recovered using a convex optimization algorithm.

The optical signal may be a range compressible waveform and the amplitude of the masked reflection of the optical signal may be measured as a function of range, wherein an array of signals from the scene may be recovered for each range slice of a plurality of range slices based on the measured amplitudes corresponding to each range slice, and wherein the recovered arrays of signals may be combined to form a volumetric data cube.

The method may further include comparing the signals in each of the arrays of signals to an exclusion threshold, and removing signals from the arrays of signals to do not satisfy the exclusion threshold. The range compressible waveform may be a pulse waveform and the amplitude of the masked reflection of the optical signal may be measured as a function of time, or the range compressible waveform may be a chirp waveform and the amplitude of the masked reflection of the optical signal may be measured as a function of frequency.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

The predicate words "configured to," "operable to," and "programmed to" do not imply any particular tangible or intangible modification of a subject but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

What is claimed is:

1. A system, comprising:
   an optical source configured to generate an optical signal comprising a range compressible waveform and illuminate a scene with the optical signal via transmit optics;
   a first spatial pattern generator comprising a first plurality of pixel elements, wherein the first spatial pattern generator is configured to form a mask, using the first plurality of pixel elements, to mask a reflection of the optical signal from the scene received via receiver optics;
   a first pattern controller coupled to the first spatial pattern generator and configured to control the first plurality of pixel elements individually to form the mask;
   a detector configured to measure an amplitude of the masked reflection of the optical signal received via detector optics;
   a digitizer coupled to the detector and configured to digitize the measured amplitude into an amplitude value; and
   a processor coupled to the first pattern controller and the digitizer, wherein the processor is configured to:
      instruct the first pattern controller to form a first sequence of masks to sequentially mask reflections of the optical signal using the first spatial pattern generator;
      store the amplitude value corresponding to the measured amplitude as a function of range of the masked reflection of the optical signal for each mask in the first sequence of masks; and
      recover an array of signals for each range slice of a plurality of range slices from the scene based on the stored amplitude values corresponding to each range slice and the first sequence of masks, wherein a number of the stored amplitude values and a number of masks in the first sequence of masks is less than a number of signals of the array of signals.

2. The system of claim 1, wherein the recovered array of signals from the scene comprises an image of the scene.

3. The system of claim 1, wherein the processor is further configured to:
   instruct the first pattern controller to form a second sequence of masks to sequentially mask the reflection of the optical signal using the first spatial pattern generator;
   store the amplitude value corresponding to the measured amplitude of the masked reflection of the optical signal for each mask in the second sequence of masks;
   determine a variance of the amplitude values stored for the second sequence of masks; and
   determine the number of masks in the first sequence of masks based on the variance of the amplitude values.

4. The system of claim 3, wherein the number of masks in the first sequence of masks is greater than a number of masks in the second sequence of masks.

5. The system of claim 3, wherein a resolution of the masks in the first sequence of masks is greater than a resolution of the masks in the second sequence of masks.

6. The system of claim 1, further comprising:
   an optical local oscillator configured to provide a local oscillator signal to the detector,
   wherein the detector is configured to measure the amplitude of the masked reflection of the optical signal using coherent detection.

7. The system of claim 6, further comprising:
   an optical splitter configured to split the local oscillator signal together with the masked reflection of the optical signal and to provide the split signals to the detector,
   wherein the detector is a balanced detector.

8. The system of claim 1, wherein the detector is configured to operate in a direct, linear mode or in a Geiger mode.

9. The system of claim 1, wherein the first spatial pattern generator is a micro electromechanical system array of micromirror devices.

10. The system of claim 1, further comprising:
    a context camera aligned to a common image plane with the first spatial pattern generator; and
    a beam splitter positioned in an optical path between the receiver optics and the spatial pattern generator,
    wherein the beam splitter is configured to split the reflection of the optical signal received via the receiver optics between the context camera and the first spatial pattern generator, and
    wherein the receiver optics are adjustable using the context camera to confirm focus of the reflection of the optical signal on the first spatial pattern generator.

11. The system of claim 1, further comprising:
    a second spatial pattern generator comprising a second plurality of pixel elements, wherein the second spatial pattern generator is configured to form a mask, using the second plurality of pixel elements, to mask the optical signal generated by the optical source before illuminating the scene; and
    a second pattern controller coupled to the second spatial pattern generator and configured to control the second plurality of pixel elements individually to form the mask,
    wherein the processor is further coupled to the second pattern controller and is further configured to:
       instruct the second pattern controller to form one or more masks to mask the optical signal generated by the optical source using the second spatial pattern generator,
       wherein the stored amplitude values include amplitude values corresponding to the measured amplitudes of the masked reflections of the masked optical signal masked using the sequence of masks formed by the first spatial pattern generator for each of the one or more masks formed by the second spatial pattern generator.

12. The system of claim 1, further comprising:
a first mixer;
a second mixer;
a splitter configured to split a signal containing the amplitude measured by the detector between the first mixer and the second mixer; and
a 90-degree splitter configured to split a waveform signal used by the optical source to generate the optical signal between the first mixer and the second mixer with a 90-degree phase shift between the split waveform signal provided to the first mixer and the split waveform signal provided to the second mixer,
wherein the first mixer is configured to mix the split signal containing the amplitude and the split waveform signal to generate an in-phase signal,
wherein the second mixer is configured to mix the split signal containing the amplitude and the spit waveform signal with the 90-degree phase shift to generate a quadrature signal, and
wherein the processor is further configured to recover the amplitude and the phase of the signal containing the amplitude measured by the detector based on the in-phase signal and the quadrature signal.

13. The system of claim 1, wherein the receiver optics and the transmit optics are a common set of optics,
wherein the system further comprises an optical switch positioned in an optical path between the common set of optics and the optical source and an optical path between the common set of optics and the first spatial pattern generator, and
wherein the optical switch is operable to switch between passing the optical signal generated by the optical source to illuminate the scene via the common set of optics, and passing the reflection of the optical signal from the scene received via the common set of optics to the first spatial pattern generator.

14. The system of claim 1, further comprising:
a plurality of optical sources configured to generate respective optical signals and illuminate the scene with the optical signals via respective transmit optics;
a plurality of first spatial pattern generators each comprising a respective first plurality of pixel elements, wherein each first spatial pattern generator is configured to form a respective mask, using the first plurality of pixel elements, to mask a reflection of the optical signal from the scene received via respective receiver optics;
a plurality of first pattern controllers coupled to the plurality of first spatial pattern generators, respectively, and configured to control the respective first plurality of pixel elements individually to form the masks;
a plurality of detectors configured to measure amplitudes of the respective masked reflections of the optical signals received via respective detector optics; and
a plurality of digitizers coupled to the plurality of detectors, respectively, and configured to digitize the respective measured amplitudes into respective amplitude values,
wherein the processor is coupled to each of the plurality of first pattern controllers and to each of the plurality of digitizers, and wherein the processor is further configured to:
instruct the plurality of first pattern controllers to form respective first sequences of masks to sequentially mask respective reflections of the optical signals using the plurality of first spatial pattern generators;
store the amplitude values corresponding to the measured amplitudes of the respective masked reflections of the respective optical signals for each mask in the first sequence of masks formed by the plurality of first spatial pattern generators; and recover signals from the scene based on the stored amplitude values and the first sequence of masks.

15. A method, comprising:
for each mask in a first sequence of masks:
generating an optical signal comprising a range compressible waveform and
illuminate a scene with the optical signal; forming the mask using a plurality of pixel elements of a first spatial pattern
generator to mask a reflection of the optical signal from the scene; and
measuring an amplitude of the masked reflection of the optical signal as a function of range; and
recovering an array of signals for each range slice of a plurality of range slices from the scene based on the measured amplitudes corresponding to each range slice and the first sequence of masks,
wherein a number of the measured amplitudes and a number of masks in the first sequence of masks is less than a number of signals in the array of signals.

16. The method of claim 15, further comprising: for each mask in a second sequence of masks:
generating the optical signal and illuminate the scene with the optical signal; forming the mask using the plurality of pixel elements of the first spatial pattern generator; and
measuring the amplitude of the masked reflection of the optical signal; determining a variance of the measured amplitudes; and
determining the number of masks in the first sequence of masks based on the determined variance of the measured amplitudes,
wherein a number of masks in the second sequence of masks is less than the number of masks in the first sequence of masks.

17. The method of claim 15, wherein the array of signals is recovered using a convex optimization algorithm.

18. The method of claim 15, wherein the recovered arrays of signals are combined to form a volumetric data cube.

19. The method of claim 15, further comprising:
comparing the signals in each of the arrays of signals to an exclusion threshold; and
removing signals from the arrays of signals to do not satisfy the exclusion threshold.

20. The method of claim 15, wherein the range compressible waveform is a pulse waveform and the amplitude of the masked reflection of the optical signal is measured as a function of time, or the range compressible waveform is a chirp waveform and the amplitude of the masked reflection of the optical signal is measured as a function of frequency.

* * * * *